(12) United States Patent
Yamashita

(10) Patent No.: US 6,742,437 B2
(45) Date of Patent: Jun. 1, 2004

(54) VALVE MECHANISM OF BOOSTER

(75) Inventor: Nobuyuki Yamashita, Saitama-Ken (JP)

(73) Assignee: Bosch Automotive Systems Corporation, Tokyo (JP)

( * ) Notice: Subject to any disclaimer, the term of this patent is extended or adjusted under 35 U.S.C. 154(b) by 0 days.

(21) Appl. No.: 10/254,488

(22) Filed: Sep. 25, 2002

(65) Prior Publication Data

US 2003/0075039 A1 Apr. 24, 2003

(30) Foreign Application Priority Data

Oct. 22, 2001 (JP) ........................................ 2001-324066

(51) Int. Cl.[7] ................................................. F15B 9/10
(52) U.S. Cl. ...................................... 91/369.1; 91/369.2
(58) Field of Search ............................. 91/369.1, 369.2, 91/369.3, 376 R

(56) References Cited

U.S. PATENT DOCUMENTS 4,884,491 A * 12/1989 Endo ......................... 91/369.2
5,027,695 A * 7/1991 Inoue et al. ................ 91/369.2

* cited by examiner

Primary Examiner—Thomas E. Lazo
(74) Attorney, Agent, or Firm—Flynn, Thiel, Boutell & Tanis, P.C.

(57) ABSTRACT

When a booster is inoperative, a first atmosphere valve and a second atmosphere valve are both closed to block a communication of an orifice passage with a variable pressure chamber. At the commencement of operation of the booster, the first atmosphere valve opens while the second atmosphere valve remains closed to allow the atmosphere to be introduced into the variable pressure chamber through the orifice passage, followed by an opening of the second atmosphere valve to allow the atmosphere to be introduced into the variable pressure chamber through the second atmosphere valve and the first atmosphere valve. This arrangement allows the occurrence of oscillations of or abnormal sounds from a valve mechanism to be prevented during the initial phase of the brake operation.

11 Claims, 9 Drawing Sheets

VALVE MECHANISM OF BOOSTER

FIELD OF THE INVENTION

The present invention relates to a booster as may be used in a brake of an automobile, and more particularly, to a valve mechanism of a booster.

DESCRIPTION OF THE PRIOR ART

A conventional booster generally comprises a valve body slidably disposed within a shell, a constant pressure chamber and a variable pressure chamber defined across a power piston secured to the valve body, and a valve mechanism disposed within the valve body to switch a flow path. The valve mechanism comprises an annular vacuum valve seat, a valve plunger slidably fitted into the valve body, an annular atmosphere valve seat formed on the valve plunger, a valve element adapted to be seated upon the vacuum valve seat and the atmosphere valve seat, a constant pressure passage communicating with a space radially outward of a vacuum valve where the vacuum valve seat is in contact with the valve element, an atmosphere passage communicating with a space located radially inward of an atmosphere valve where the atmosphere valve seat is in contact with the valve element, and a variable pressure passage communicating with a space located between the vacuum valve and the atmosphere valve.

When the booster constructed in the manner mentioned above is inoperative, the valve element is seated upon the atmosphere valve seat which is formed on the valve plunger to close the atmosphere valve, thus interrupting the communication between the atmosphere passage and the variable pressure passage while the valve element is removed from the vacuum valve seat to open the vacuum valve to allow the constant pressure passage to communicate with the variable pressure passage. Under this condition, the constant pressure chamber and the variable pressure chamber defined across the power piston of the booster communicate with each other through the constant pressure passage and the variable pressure passage, and accordingly, there is no pressure differential across the power piston and hence the valve body and the valve plunger remain at rest in their inoperative positions.

On the other hand, when the booster is actuated, the valve element becomes removed from the atmosphere valve seat which is formed on the valve plunger to open the atmosphere valve, thus allowing the atmosphere passage to communicate with the variable pressure passage while the valve element becomes seated upon the vacuum valve seat to close the vacuum valve to interrupt the communication between the constant pressure passage and the variable pressure passage. Under this condition, the variable pressure passage defined behind the power piston of the booster communicates with the atmosphere through the variable pressure passage and the atmosphere passage, whereby a pressure differential acts upon the power piston to drive the valve body forward.

The described booster performs a booster operation by operating the valve mechanism in a manner such that an input applied to a brake pedal and a reaction from a master cylinder is balanced. However, when a reaction from the master cylinder is small during an initial phase of operating the brake, a servo balance condition of the valve mechanism where the vacuum valve and the atmosphere valve are both closed becomes unstable, causing inconveniences such as developing oscillations and abnormal sounds.

Specifically, when the reaction from the master cylinder is small in magnitude, the force which acts in a direction to close the atmosphere valve is small, and thus the atmosphere valve cannot be instantly closed, allowing an excess of the atmosphere to be introduced into the variable pressure chamber. This results in opening the vacuum valve when the atmosphere valve is successfully closed as the valve mechanism subsequently tends to balance in response to the reaction from the master cylinder and the input from the brake pedal because the reaction is relatively large in proportion to the input.

This problem also relates to the master cylinder. For example, recently, there is a brake system in which a braking liquid from a reservoir is fed through a liquid pressure chamber of the master cylinder to develop a braking pressure when the master cylinder is not operated. In a design, such a brake system has a wide passage between the liquid pressure chamber of the master cylinder and the reservoir in order to allow the braking liquid to be fed rapidly from the reservoir.

With such a master cylinder, a liquid pressure cannot build up in the liquid pressure chamber until a piston which is linked to the booster interrupts the communication between the reservoir and the liquid pressure chamber. Accordingly, a reaction from the master cylinder is reduced during the initial phase of brake operation, causing the described inconveniences.

SUMMARY OF THE INVENTION

In view of the foregoing, it is an object of the present invention to provide a valve mechanism of a booster which prevents an excess of the atmosphere from being introduced into the variable pressure chamber during the initial phase of brake operation, thereby allowing the occurrence of oscillations or abnormal sounds to be prevented during the initial phase of operation of the valve mechanism.

Specifically, the present invention relates to a valve mechanism of a booster comprising a vacuum valve which opens or closes a communication between a constant pressure chamber and a variable pressure chamber defined across a power piston, and a first atmosphere valve which opens or closes a communication between the variable pressure chamber and the atmosphere. In accordance with the present invention, the valve mechanism also comprises a second atmosphere valve which is disposed nearer the atmosphere than the first atmosphere valve for opening or closing a communication between the first atmosphere valve and the atmosphere, and an orifice passage which allows a portion of the second atmosphere valve which is disposed nearer the first atmosphere valve to communicate with the atmosphere, the arrangement being such that when the booster is inoperative, both the first and the second atmosphere valve are closed to interrupt the communication between the variable pressure chamber and the atmosphere while when the booster is actuated, the first atmosphere valve is opened to allow the atmosphere to be introduced into the variable pressure chamber through the orifice passage and subsequently the second atmosphere valve opens to allow the atmosphere to be introduced into the variable pressure chamber through the second atmosphere valve together with the orifice passage.

With the described arrangement of the present invention, under the condition that the first atmosphere valve, which corresponds to the atmosphere valve of a conventional booster, is open, the variable pressure chamber is blocked from communication with the atmosphere by the second atmosphere valve which remains closed, but communicates with the atmosphere only through the orifice passage, which restricts the inflow of the atmosphere into the variable pressure chamber, thus reducing the amount of the atmosphere introduced into the variable pressure chamber in comparison to the conventional booster.

This allows an appropriate output to be obtained in response to an input during the initial phase of the brake operation, preventing a subsequent occurrence of oscillations of or abnormal sounds from the valve mechanism.

When a second seat on the valve element, which forms a second atmosphere valve, becomes removed from the first atmosphere valve on the valve plunger, the atmosphere can be rapidly introduced into the variable pressure chamber through the second atmosphere valve and the first atmosphere valve which is previously open, allowing the brake booster to operate in the similar manner as in the prior art.

Above and other objects, features and advantages of the present invention will become apparent from the following detailed description of several embodiments thereof with reference to the drawings.

DETAILED DESCRIPTION OF THE EMBODIMENTS

A negative pressure booster 1 to which a valve mechanism 15 according to the present invention is applied will now be described with reference to the drawings.

Figure 1:
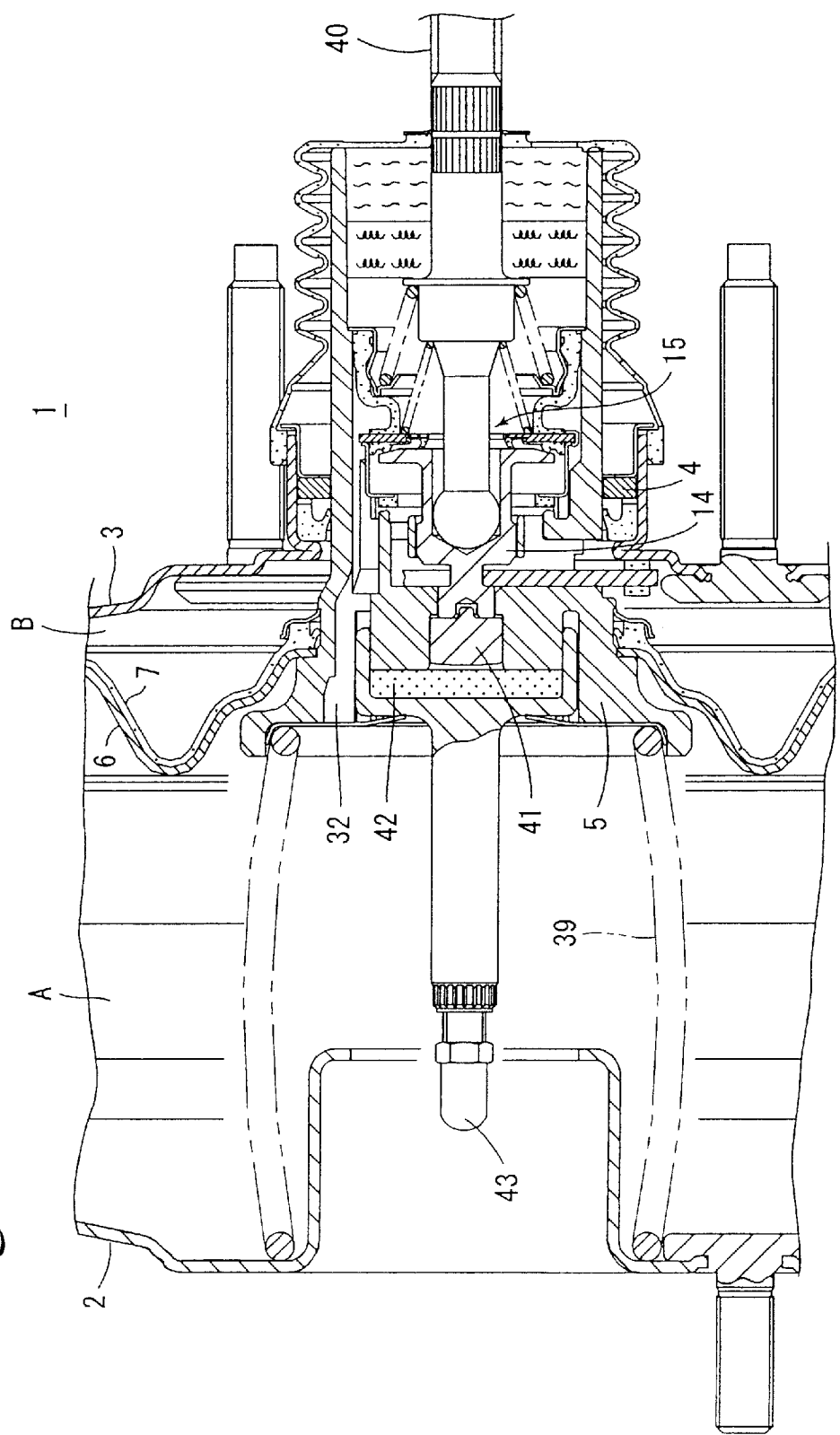
FIG. 1 is a cross section of one embodiment of the present invention.
Figure 2:
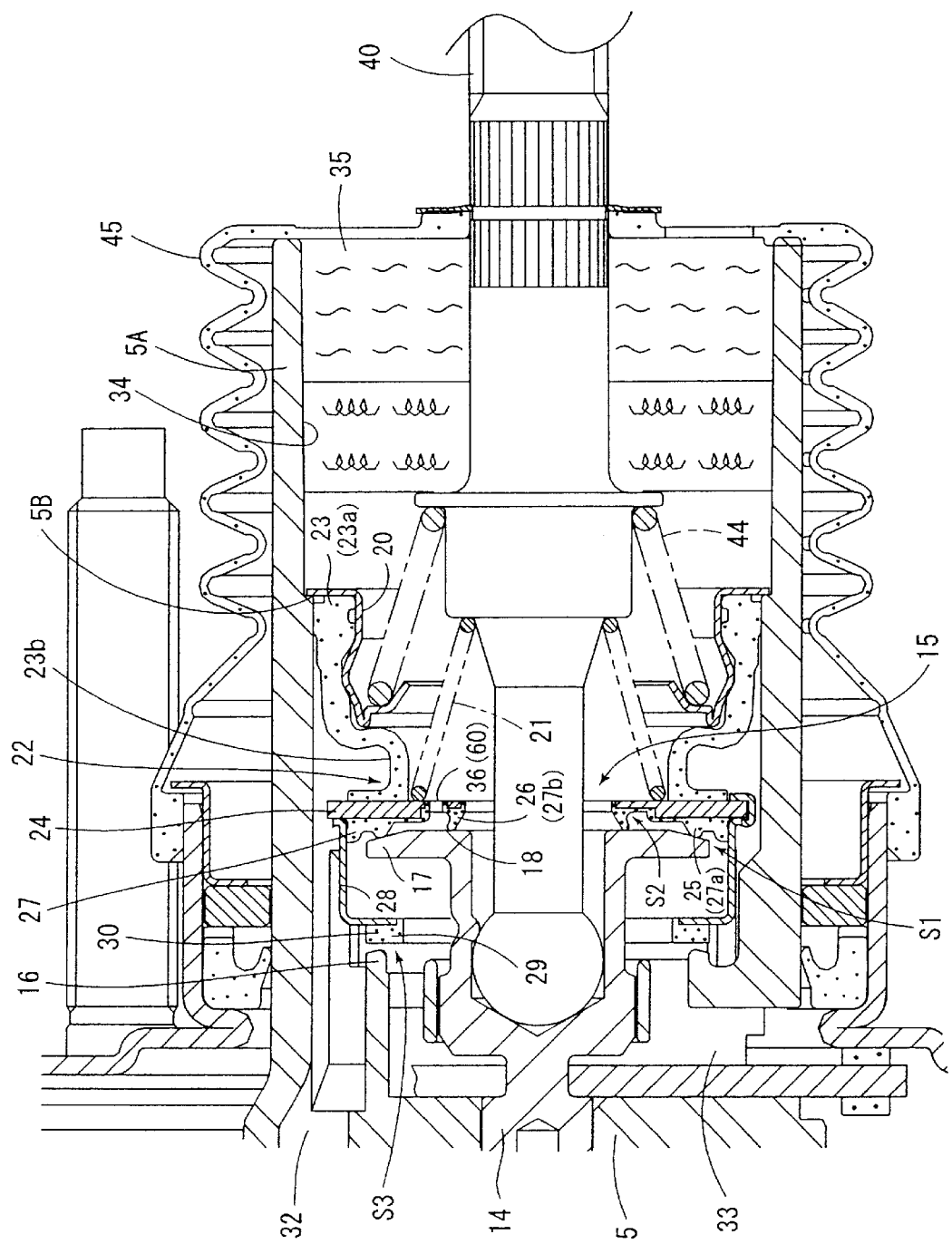
FIG. 2 is an enlarged cross section of an essential part shown in FIG. 1.

Referring to FIGS. 1 and 2, a front shell 2 and a rear shell 3 are disposed in opposing relationship to define an enclosed space in which a substantially tubular valve body 5 is slidably disposed to extend through an axial portion of the space within the rear shell 3 with a hermetic seal maintained by a seal member 4.

A power piston 6 is connected around the outer periphery of the valve body 5, and a diaphragm 7 is applied to the back surface of the power piston 6 to define a constant pressure chamber A and a variable pressure chamber B across the diaphragm 7.

The valve mechanism 15 which switches a fluid circuit between the constant pressure chamber A and the variable pressure chamber B is disposed within the valve body 5, as shown to an enlarged scale in FIG. 2. The valve mechanism 15 comprises an annular vacuum valve seat 16 formed around the inner periphery of the valve body 5, a first atmosphere valve seat 17 and a second atmosphere valve seat 18, both annular, which are formed on the rear end face of a valve plunger 14 which is slidably mounted on the valve body 5, and a valve element 22 which is adapted to be seated upon the vacuum valve seat 16, the first atmosphere valve seat 17 and the second atmosphere valve seat 18 from the right side, as viewed in FIG. 2, under the resilience of a spring 21.

The valve element 22 is substantially tubular, and comprises a tubular resilient body 23 formed of a resilient material and including a mount 23a which is mounted on the inner periphery of a tubular terminal portion 5A of the valve body 5 and a tubular curved portion 23b which continues from the mount 23a and extending forwardly, a reinforcing plate 24 formed of a resilient material mounted on the front end of the tubular resilient body 23 and having a rigidity, a resilient body 27 also formed of a resilient material and including a first seat 25 which is adapted to be seated upon the first atmosphere valve seat 17 and a second seat 26 which is adapted to be seated upon the second atmosphere valve seat 18, both being mounted on the reinforcing plate 24, a tubular member 28 connected to the outer periphery of the reinforcing plate 24 and extending axially forward and having a rigidity, and a resilient body 30 mounted on the front end of the tubular member 28 which is folded radially inward and having a third seat 29 which is adapted to be seated upon the vacuum valve seat 16. The tubular resilient body 23 is fixedly mounted within the tubular terminal portion 5A while maintaining a hermetic seal by having its mount 23a held sandwiched between the inner peripheral surface of the tubular terminal portion 5A and a retainer 20 which is disposed in abutment against a step 5B formed on the same inner periphery.

A combination of the vacuum valve seat 16 and the third seat 29 which is adapted to be seated thereupon defines a vacuum valve S3. A space located radially outward of the vacuum valve S3 communicates with the constant pressure chamber A through an axial constant pressure passage 32 (see FIG. 1) formed in the valve body 5. The constant pressure chamber A communicates with a source of negative pressure for an engine through a tubing, not shown, which is mounted on the front shell 2 for introducing a negative pressure.

A combination of the first atmosphere valve seat 17 and the first seat 25 which is adapted to be seated thereupon defines a first atmosphere valve S1. A space located between the first atmosphere valve S1 and the vacuum valve S3 communicates with the variable pressure chamber B through a radial pressure passage 33 formed in the valve body 5. Finally, a space located radially inward of the first atmosphere valve S1 communicates with the external atmosphere through an atmosphere passage 34 which is formed within the tubular terminal portion 5A of the valve body 5, and a filter 35 is disposed in the atmosphere passage 34.

In addition, a combination of the second atmosphere valve seat 18 and the second seat 26 which is adapted to be seated thereupon defines a second atmosphere valve S2, the inside and the outside of which, or more specifically, a space located between the second atmosphere valve S2 and the first atmosphere valve S1, communicate with each other through an orifice passage 36 in the form of a through-opening 60 axially extending through the resilient body 27 which forms the valve element 22 and the reinforcing plate 24.

In the present embodiment, the first seat 25 and the second seat 26 are provided as annular projections 27a and 27b which are disposed concentrically and which project forwardly. The annular projection 27b for the second seat 26 has a rigidity which is less than the rigidity of the annular projection 27a for the first seat 25 so that at the commencement of operation of the booster, the second atmosphere valve S2 is opened in delayed relationship to the first atmosphere valve 51 and when the booster is inoperative, the first atmosphere valve S1 and the second atmosphere valve S2 both remain closed to block a communication between the variable pressure chamber and the atmosphere. In addition, the annular projection 27b for the second seat 26 is slanted radially outward in order to reduce air resistance to the atmosphere as it is introduced.

As shown in FIG. 1, the right end of the valve plunger 14 is pivotally connected to the distal end of an input shaft 40, the other end of which is connected to a brake pedal, not shown. On the other hand, a plunger 41 and a reaction disc 42 are disposed to the left of the valve plunger 14 in the sequence named, and the reaction disc 42 is fitted in the right end of an output shaft 43.

A valve return spring 44 is disposed between the input shaft 40 and the retainer 20 which is fixedly mounted on the valve body 5, and thus urges the input shaft 40 and the valve plunger 14 which is connected to the input shaft rearward to maintain the inoperative position where the vacuum valve S3 is open while the first atmosphere valve S1 and the second atmosphere valve S2 are closed.

The left end of the output shaft 43 projects externally through an axial portion of the front shell 1 in a slidable manner for connection with the piston of a master cylinder, not shown. The valve body 6 is normally maintained in its inoperative position shown by a return spring 39.

The tubular terminal portion 5A projects axially rearward through an opening of the rear shell 3, and the portion of the tubular terminal portion 5A which projects through the opening is covered by a dust cover 45 formed of rubber.

In the inoperative position of the described arrangement as shown in FIGS. 1 and 2, the first seat 25 and the second seat 26 of the valve element 22 are seated upon the first atmosphere valve seat 17 and the second atmosphere valve seat 18, respectively, on the valve plunger 14 under the resilience of the spring 21 to interrupt the communication between the atmosphere passage 34 and the variable pressure passage 33. The third seat 29 is removed from the vacuum valve seat 16 to allow a communication between the variable pressure passage 33 and the constant pressure passage 32, whereby the variable pressure chamber B communicates with the constant pressure chamber A, and a negative pressure is introduced into chambers. At this time, the space located between the first atmosphere valve S1 and the second atmosphere valve S2 communicates with the atmosphere through the orifice passage 36.

In this manner, the vacuum valve S3 and the first atmosphere valve S1 are disposed in tandem in the axial direction. In the present embodiment in which the first atmosphere valve S1 is chosen to be of substantially the same diameter as the vacuum valve S3, the area of the valve element 22 over which the atmosphere acts is reduced in comparison to an arrangement in which the first atmosphere valve S1 were disposed inside the vacuum valve S3, thus allowing the resilience of the valve return spring 44 to be reduced to reduce an input required to initiate the operation.

When a brake pedal, not shown, is depressed under the inoperative condition shown, the input shaft 40 and the valve plunger 14 are driven forward relative to the valve body 5 while compressing the valve return spring 44, and the third seat 29 of the valve element 22 which is driven forward while being disposed in abutment against the valve plunger 14 becomes seated upon the vacuum valve seat 16 on the valve body 5 to interrupt the communication between the constant pressure passage 32 and the variable pressure passage 33. As the input shaft 40 and the valve plunger 14 continue to be driven forward against the resilience of the valve return spring 44 and the spring 21, the first seat 25 becomes removed from the first atmosphere valve seat 17 while the second seat 26 of the valve element 22 remains seated upon the second atmosphere valve seat 18 on the valve plunger 14, whereby the variable pressure passage 33 communicates with the atmosphere through the orifice passage 36 to allow the atmosphere which passes through the orifice passage 36 to be introduced into the variable pressure chamber B to actuate the booster 1.

Thus it will be seen that as compared with a conventional arrangement in which the atmosphere is introduced into the variable pressure chamber by merely opening the atmosphere valve which corresponds to the first atmosphere S1 of the present invention, in accordance with the invention, the atmosphere is introduced into the variable pressure chamber B through the orifice passage 36 while blocking the communication of the variable pressure chamber 33 with the atmosphere by the second atmosphere valve S2. In this manner, the output during the initial phase of the brake operation rises gently. In other words, it is possible to achieve an output which depends on the magnitude of an input, thus permitting the occurrence of oscillations of or abnormal sounds from the valve mechanism 15 to be prevented during the initial phase of the brake operation.

Subsequently, as the brake pedal is further depressed to drive the input shaft 40 and the valve plunger 14 forward relative to the valve body 5 while compressing the valve return spring 44, the second seat 26 of the valve element 22 which has been seated upon the second atmosphere valve seat 18 on the valve plunger 14 becomes removed therefrom, whereupon the variable pressure passage 33 which has been in communication with the atmosphere through the orifice passage 36 now communicates with the atmosphere through the first atmosphere valve S1 and the second atmosphere valve S2. This allows the atmosphere to be rapidly introduced into the variable pressure chamber B through the first atmosphere valve S1 and the second atmosphere valve S2, allowing the output from the booster 1 to rise rapidly. Since the second seat 26 is slanted radially outward, it allows a smooth flow of the atmosphere radially outward between the second seat 26 and the opposing valve plunger 14.

It will be appreciated that the second seat 26 may also be slanted in a radially inward direction.

Figure 3:
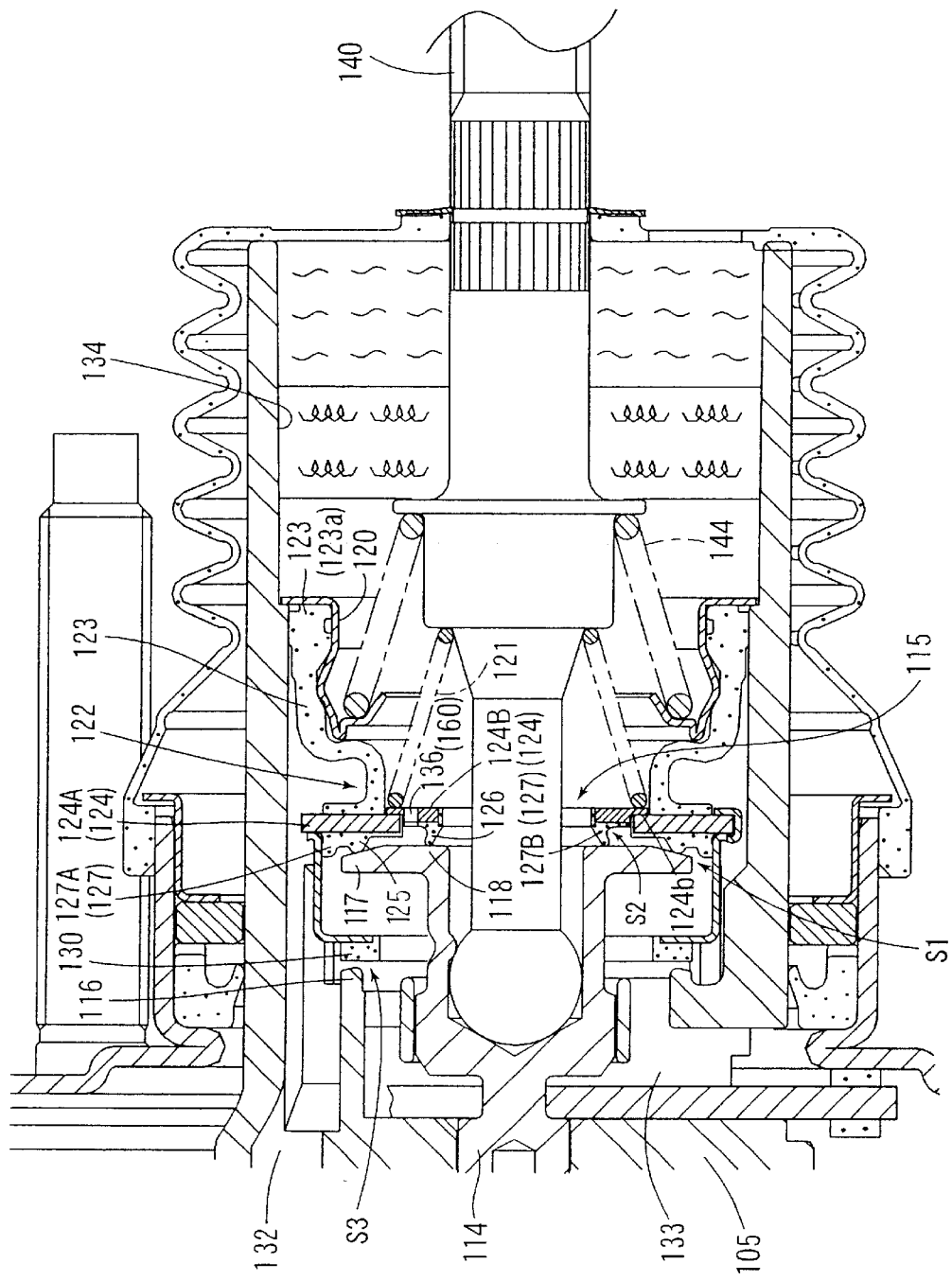
FIG. 3 is an enlarged cross section of an essential part of a second embodiment of the present invention.

FIG. 3 shows a second embodiment of the present invention where the first atmosphere valve S1 and the second atmosphere valve S2 which have been constructed in an integral manner in the first embodiment are formed separately.

Specifically, a reinforcing plate 124 comprises a first plate member 124A which is mounted on the rear end of a tubular resilient body 123 and forms a first valve element, and a second plate member 124B fitted inside the first plate member 124A and forming a second valve element. In addition, a resilient body 127 comprises a first resilient member 127A mounted on the first plate member 124A and forming a first atmosphere valve S1, and a second resilient member 127B mounted on the second plate member 124B and forming a second atmosphere valve S2. A first seat 125 is formed on the first resilient member 127A, and a second seat 126 is formed on the second resilient member 127B.

Around the outer periphery, the second plate member 124B is formed at its front portion with a step 124b which is fitted into the first plate member 124A from the rear side, and the second plate member 124B is connected integrally to the first plate member 124A by fitting the step 124b into the first plate member 124A. A through-opening 160 in the form of an orifice passage 136 which axially extends through the second resilient member 127B and the second plate member 124B is formed at a given circumferential position which is located radially inward of the integral connection between the first and the second plate member and inward of a spring 121.

In other respects, the arrangement is similar to the first embodiment described above, and accordingly, parts corresponding to those shown in the first embodiment are designated by like reference numerals as used before, to which 100 is added.

Thus, in the second embodiment, the second plate member 124B having the orifice passage 136 and the second resilient member 127A are added to a conventional valve mechanism known in the art in which a vacuum valve and an atmosphere valve are disposed axially in tandem. It will be seen that the second embodiment is capable of achieving a similar functioning and effect as achieved by the first embodiment.

Figure 4:
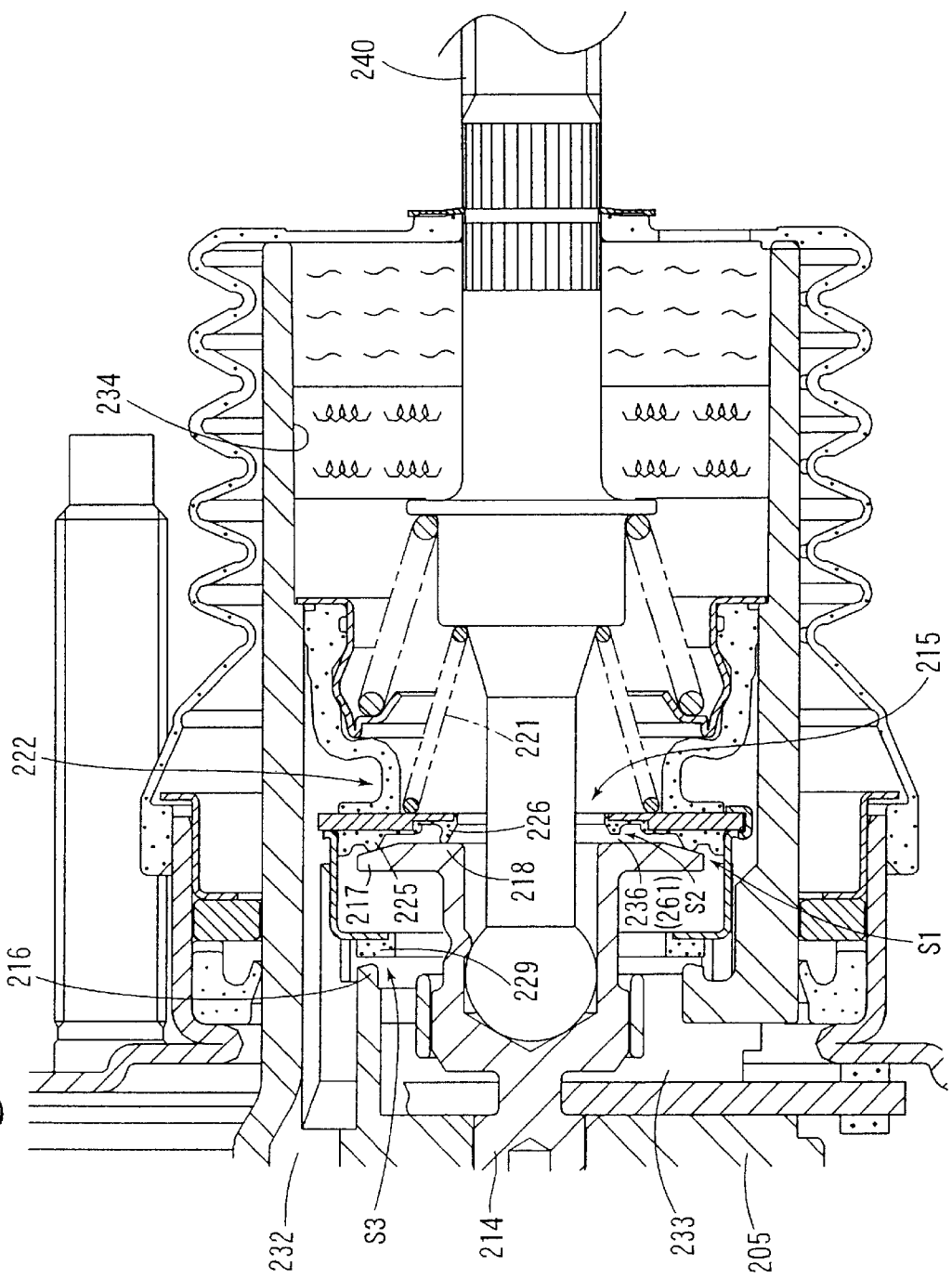
FIG. 4 is an enlarged cross section of an essential part of a third embodiment of the present invention.

FIG. 4 shows a third embodiment of the present invention in which the annular projection 27b for the second seat 26 which has been circumferentially continuous in the first embodiment is notched at several locations, allowing the notches 261 to serve as an orifice passage 236.

In other respects, the arrangement is similar to the first embodiment, and accordingly, parts corresponding to those shown in the first embodiment are designated by like numerals as used before, to which 200 is added.

With this arrangement, the manufacturing cost can be reduced in comparison to the first embodiment in which the orifice passage 36 is defined by the through-opening 60 which axially extends through the reinforcing plate 24 and the resilient body 27.

It is to be understood that this embodiment can be applied to the second embodiment having the same second seat 126 as in the first embodiment.

Figure 5:
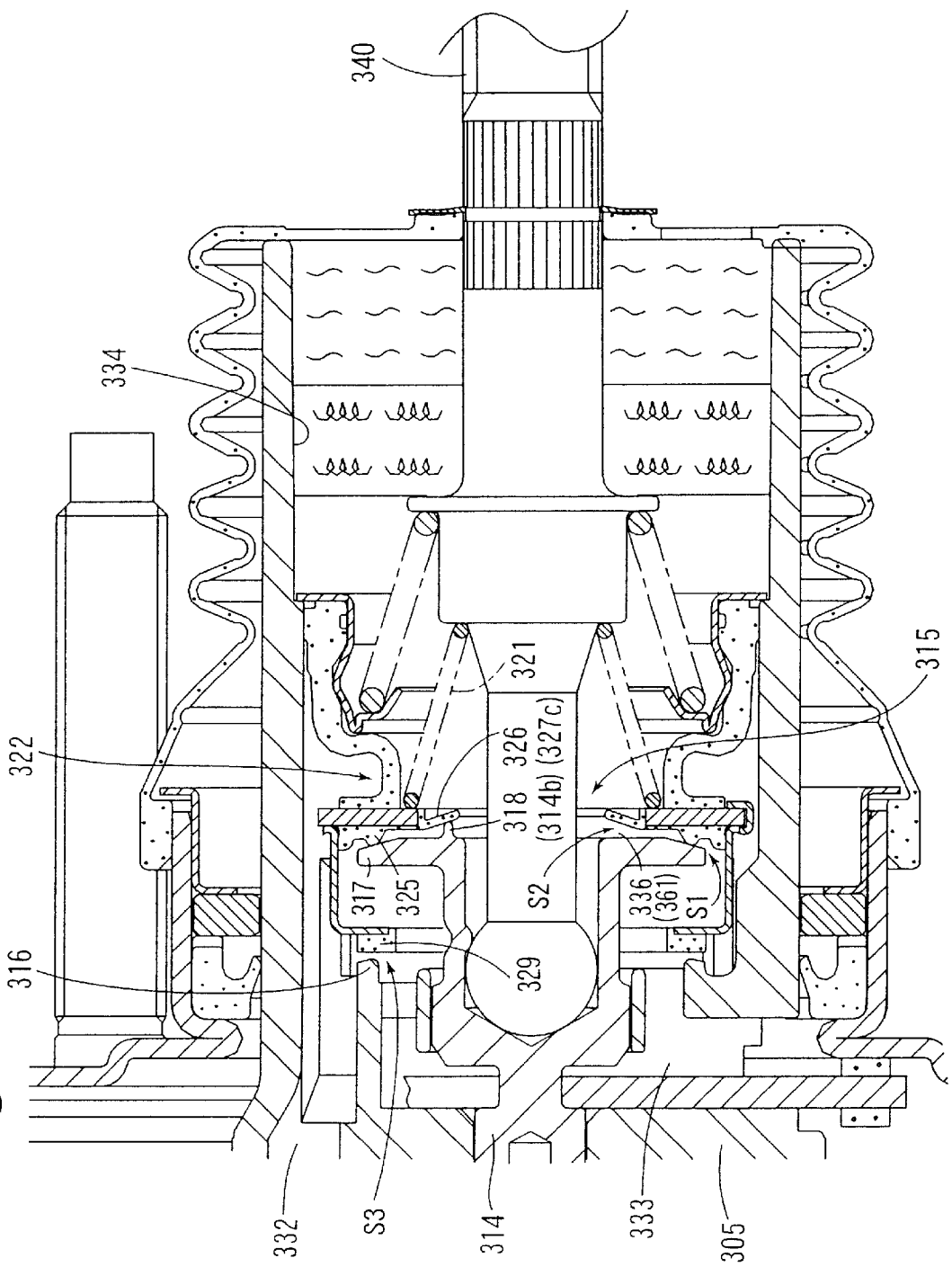
FIG. 5 is an enlarged cross section of an essential part of a fourth embodiment of the present invention.

FIG. 5 shows a fourth embodiment of the present invention. In this embodiment, the rear end face of a valve plunger 314, which has been formed flat in the first embodiment, is partly formed with a rearwardly projecting annular projection 314b which serves as a second atmosphere valve seat 318. On the other hand, the second seat 26 which is defined by the forwardly projecting annular projection 27b in the first embodiment is eliminated, and replaced by an annular lip 327c which projects into a reinforcement plate 324 to be seated on the second atmosphere valve seat 318, thus serving as a second seat 326. The annular projection 314b serving as the second atmosphere valve seat 318 is partly notched to provide notches 361 which serve as an orifice passage 336.

In other respects, the arrangement is similar to the first embodiment, and accordingly, parts corresponding to those shown in the first embodiment are designated by like reference numerals as used before, to which 300 is added.

Thus, it is intended in the present embodiment that the annular projection 27b for the second seat 26 in the first embodiment is replaced by the annular lip 327c which can be formed with a reduced rigidity, thus assuring that the second atmosphere valve S2 can be opened in delayed relationship to the first atmosphere valve S1.

Figure 6:
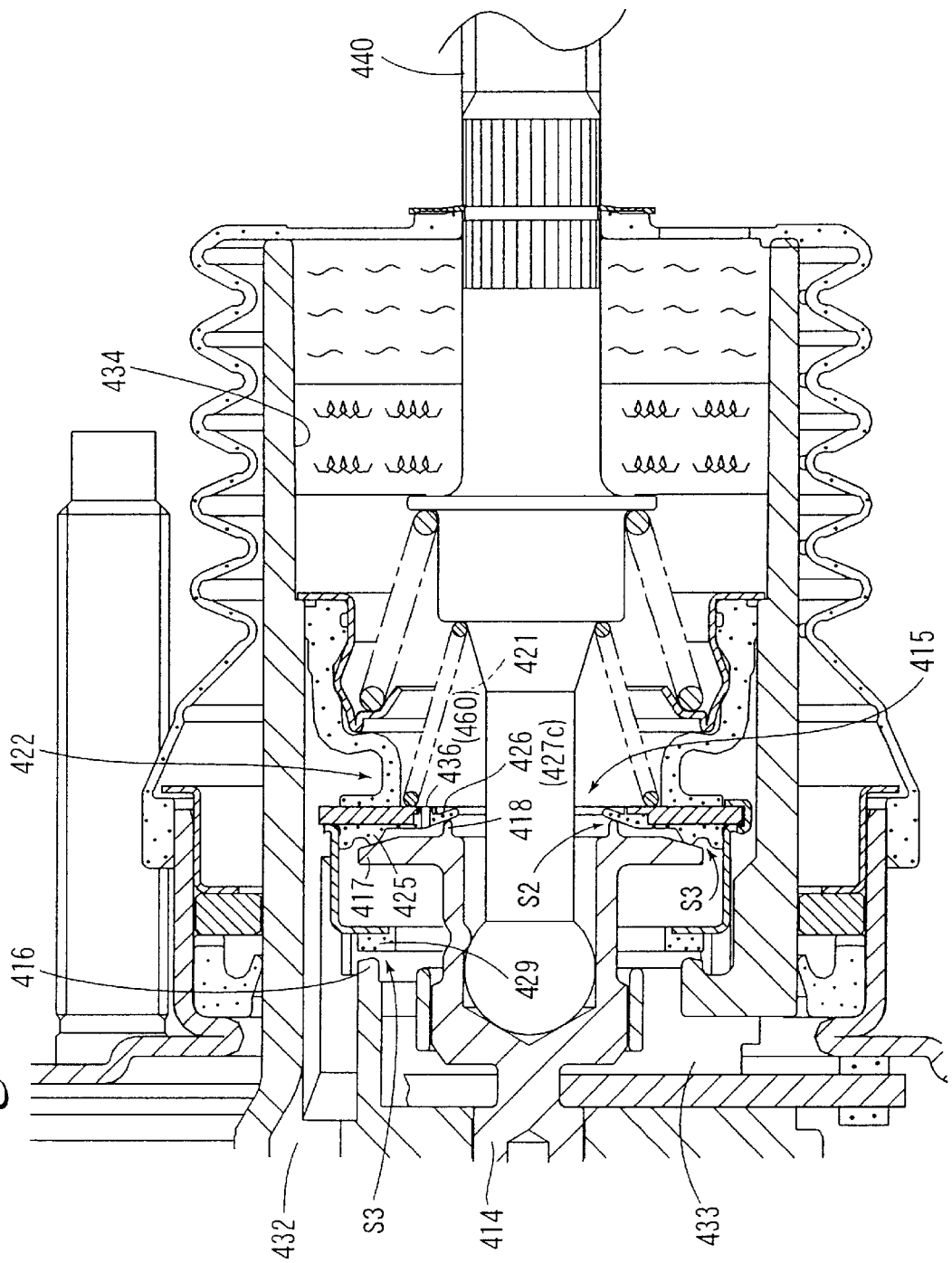
FIG. 6 is an enlarged cross section of an essential part of a fifth embodiment of the present invention.

FIG. 6 shows a fifth embodiment of the present invention. In the present embodiment, notches 361 which have been formed in the second atmosphere valve seat 318 in the fourth embodiment are eliminated to provide a circumferential continuity, and a through-opening 460 which extends through a resilient body 427 and a reinforcing plate 424 is provided outward of a second seat 426 which is adapted to be seated upon a second atmosphere valve seat 418, allowing the through-opening 460 to serve as an orifice passage 436.

In other respects, the arrangement is similar to the first embodiment described above, and accordingly, parts corresponding to those shown in the first embodiment are designated by like reference numerals as used before, to which 400 is added.

It will be seen that this embodiment is also capable of achieving a similar functioning and effect as achieved by the fourth embodiment.

Figure 7:
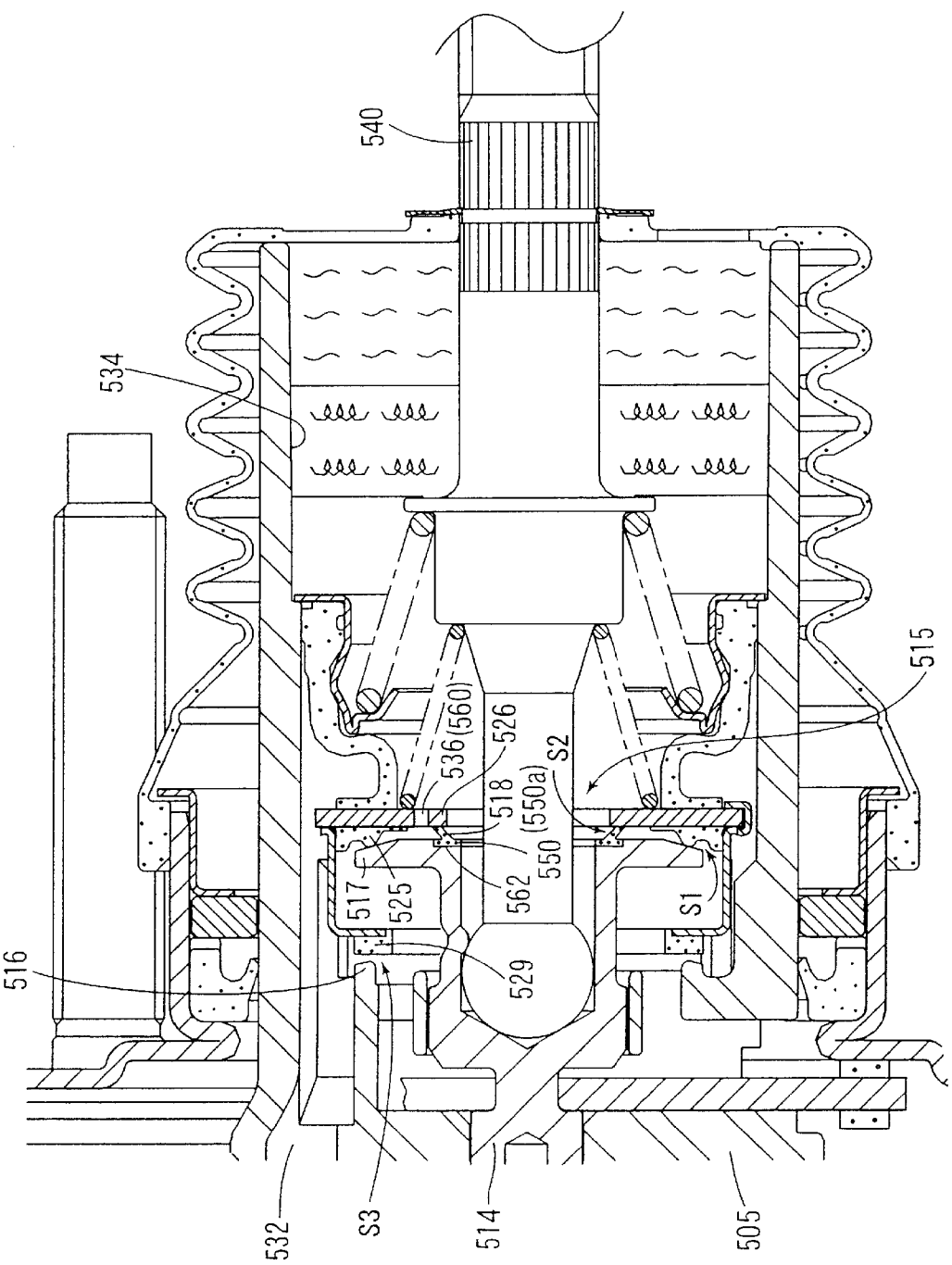
FIG. 7 is an enlarged cross section of an essential part of a sixth embodiment of the present invention.

FIG. 7 shows a sixth embodiment of the present invention. In the present embodiment, the annular projection 414b which serves as a second atmosphere valve seat 418 and which is integrally formed with the valve plunger 414 in the fifth embodiment is eliminated, and instead an annular step 562 is provided at a corresponding position. A resilient body 550 having a rearwardly projecting annular projection 550a, which serves as a second atmosphere valve seat 518, is disposed inside the annular step 562. In addition, the annular lip 427c on the resilient body 427 which is provided to serve as the second seat 426 in the fifth embodiment is eliminated, and instead the inner edge of a reinforcing plate 524 is extended to a corresponding position and an annular second seat 526 is defined as the position where the reinforcing plate 524 abuts against the resilient body 550 serving as the annular projection 550a. A through-opening 560 which axially extends through the reinforcing plate 524 at a location outward of the second seat 526 is provided to serve as an orifice passage 536.

In other respects, the arrangement is similar to the first embodiment, and accordingly, parts corresponding to those shown in the first embodiment are designated by like reference numerals as used before, to which 500 is added.

It will be seen that this embodiment is also capable of achieving a similar functioning and effect as achieved by the fifth embodiment.

It is to be noted that in the present embodiment, the through opening 560 in the reinforcing plate 524 serves as the orifice passage 536, but the through-opening 560 may be eliminated, and instead the front end of the annular projection 550a which serves as the second atmosphere valve seat 518 may be notched (not shown) so that the notches serve as an orifice passage.

Figure 8:
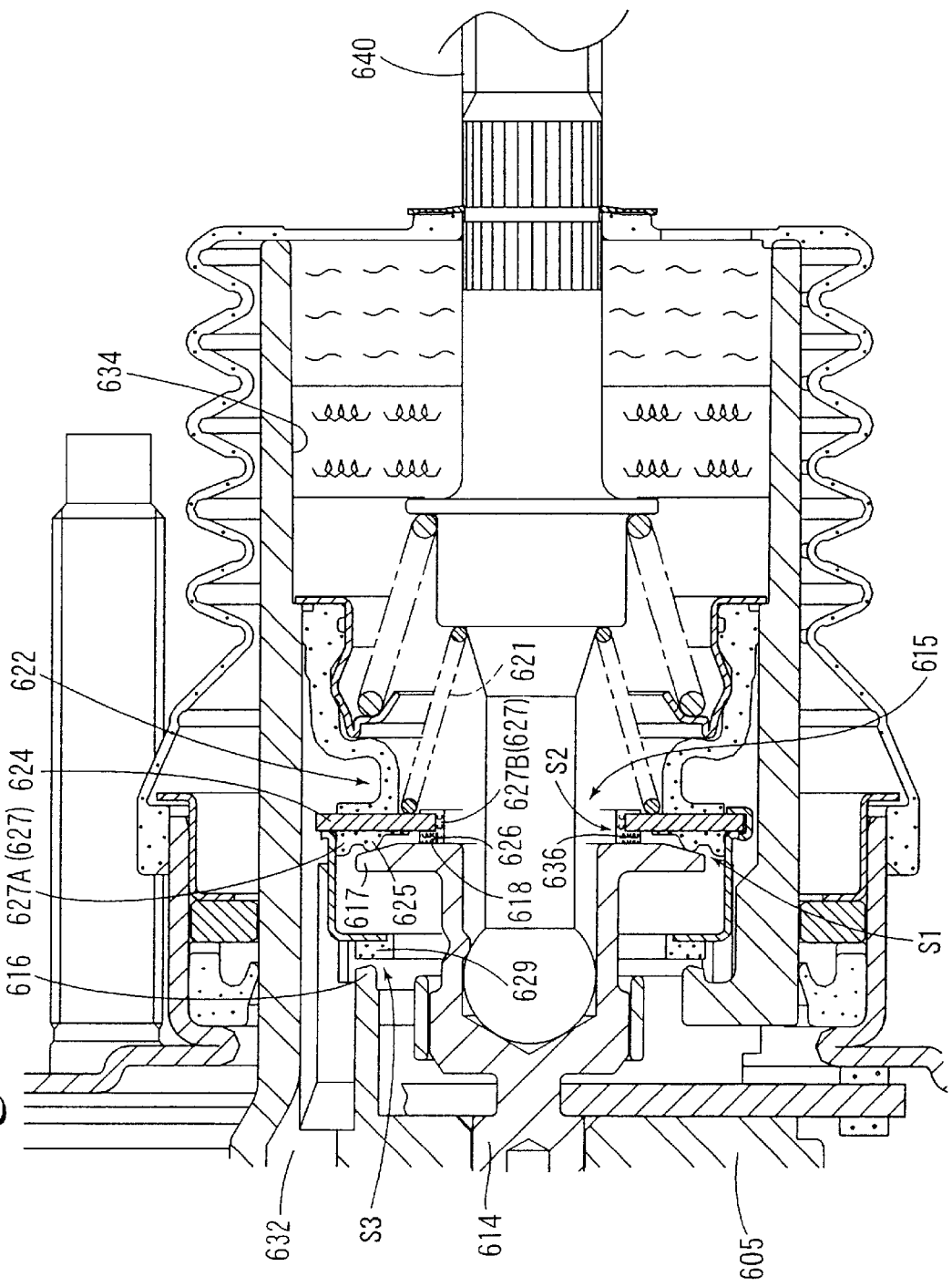
FIG. 8 is an enlarged cross section of an essential part of a seventh embodiment of the present invention.

FIG. 8 shows a seventh embodiment of the present invention. In the present embodiment, a first resilient member 627A having a first seat 625 is formed of a high density resilient material having an air resistance while a second resilient member 627B, which is separate from the first resilient member 627A and forms a second seat 626, is formed of a foamed, resilient material having a permeability such as sponge. In other words, the second resilient member 627B itself serves as an orifice 636 which restricts a flow of the atmosphere. The second resilient member 627B has a rigidity which is chosen to be less than the rigidity of the first resilient member 627A, allowing the second atmosphere valve S2 to be opened in delayed relationship to the first atmosphere valve S1.

In other respects, the arrangement is similar to the first embodiment, and accordingly, parts corresponding to those shown in the first embodiment are designated by like reference numerals as used before, to which 600 is added.

It will be seen that this embodiment is also capable of achieving a similar functioning and effect as achieved by the first embodiment.

Figure 9:
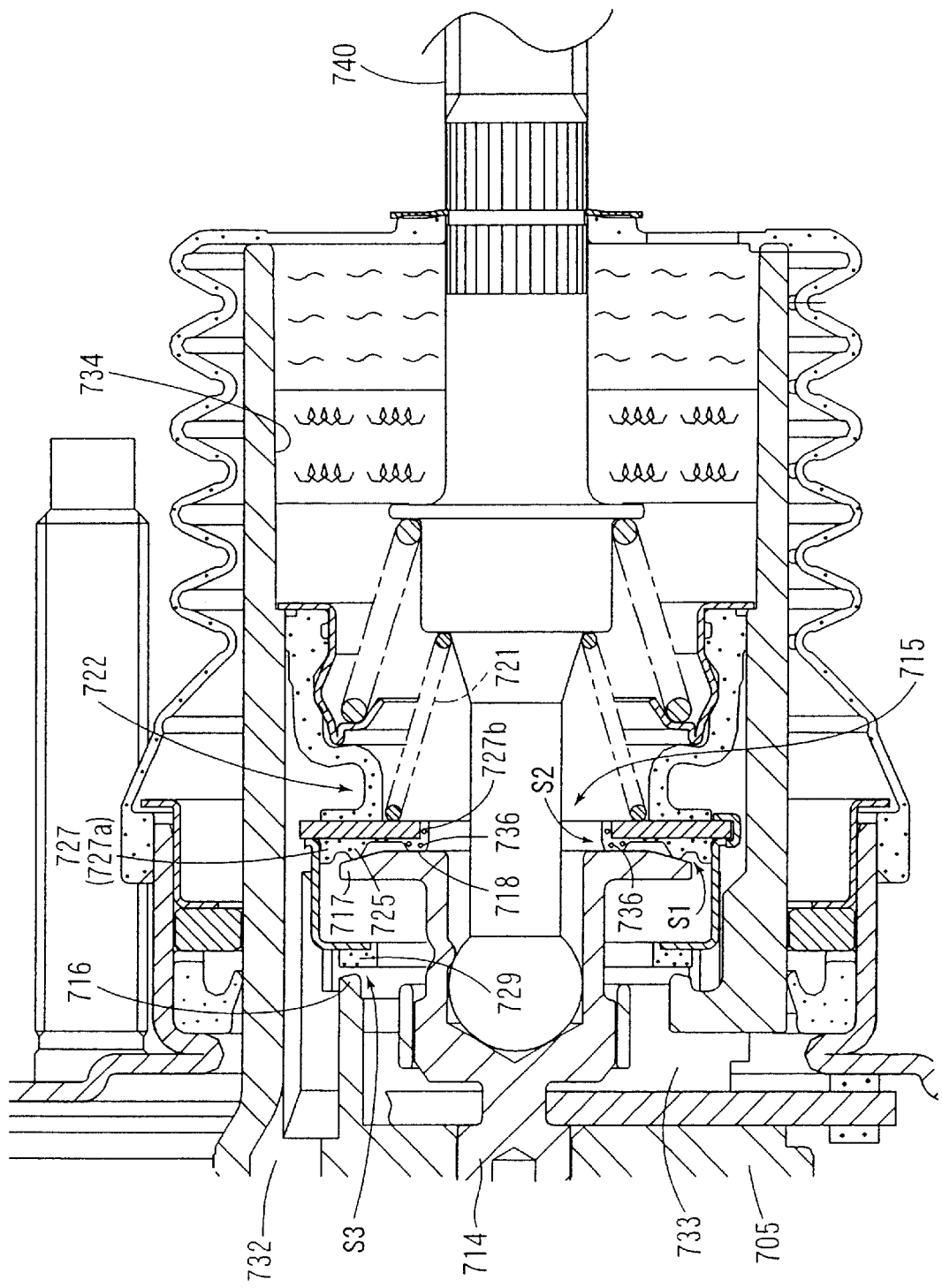
FIG. 9 is an enlarged cross section of an essential part of an eighth embodiment of the present invention.

In the above description of the seventh embodiment, the first resilient member 627A which defines the first atmosphere valve S1 is separate from the second resilient member 627B which defines the second atmosphere valve S2, but it should be understood that the arrangement is not limited thereto, but as shown in an eighth embodiment shown in FIG. 9, an integral construction may be used including a first resilient portion 727a formed of a high density material and defining the first atmosphere valve S1 and a second resilient portion 727b formed of a low density material and defining the second atmosphere valve S2 in order to improve the ease of assembly in comparison to the seventh embodiment.

In the described embodiments, a valve mechanism includes a vacuum valve and an atmosphere valve which are disposed in tandem in the axial direction, but the present invention is not limited thereto and is equally applicable to a valve mechanism in which a vacuum valve and an atmosphere valve are located radially relative to each other, for example.

Also in the described embodiments, the second atmosphere valve S2 and the orifice passage 36, 136, 236, 336, 436, 536, 636 or 736 are disposed toward the atmosphere passage 34, 134, 234, 334, 434, 534, 634 or 734 of the first atmosphere valve S1. However, the invention is not limited to such arrangement. Alternatively, a third atmosphere valve and a second orifice passage (or more atmosphere valves and orifice passages) may be sequentially disposed on the atmosphere side of the second atmosphere valve S2 and the orifice passage 36, 136, 236, 336, 436, 536, 636 or 736 so that when the brake booster is actuated, a second atmosphere valve, and a third atmosphere valve may be sequentially opened after the opening of the first atmosphere valve in the sequence that they are located nearest to the first atmosphere valve. When such an arrangement is employed, the channel area of a passage through which the atmosphere is introduced into the variable pressure chamber increases in a gradual manner during the initial phase of brake operation, allowing the rate of introducing the atmosphere into the variable pressure chamber to be changed.

While the invention has been described above in connection with several embodiments thereof, it should be understood that a number of changes, modifications and substitutions therein are possible from the above disclosure without departing from the spirit and the scope of the invention defined by the appended claims.

What is claimed is:

1. A valve mechanism of a booster including a vacuum valve for opening or closing a communication between a constant pressure chamber and a variable pressure chamber defined across a power piston; a first atmosphere valve for opening or closing a communication of the variable pressure chamber with the atmosphere, the first atmosphere valve being slidably disposed inside the power piston and comprising a first atmosphere valve seat formed on a valve plunger which is linked to an input shaft and a first seat formed on a valve element and adapted to be seated upon the first atmosphere valve seat; a second atmosphere valve for opening and closing a communication of the first atmosphere valve with the atmosphere disposed at a location nearer the atmosphere than the first atmosphere valve, the second atmosphere valve comprising a second atmosphere valve seat formed on the valve plunger and a second seat formed on the valve element; and an orifice passage comprising a through-opening axially extending between the first seat and the second seat on the valve element for allowing a communication between a portion of the second atmosphere valve which is located toward the first atmosphere valve and the atmosphere, wherein when the booster is inoperative, the first atmosphere valve and the second atmosphere valve are both closed by the first seat on the valve element being seated upon the first atmosphere valve seat on the valve plunger and the second seat on the valve element being seated upon the second atmosphere valve seat on the valve plunger to interrupt the communication of the variable pressure chamber with the atmosphere and when the booster is actuated the atmosphere is introduced into a space defined by the first atmosphere valve, the second atmosphere valve, the valve plunger and the valve element through the orifice passage by the first atmosphere valve by the first atmosphere valve opening by the first atmosphere valve seat and the first seat separating from each other to allow the atmosphere to be introduced into the variable pressure chamber through the orifice passage followed by the opening of the second atmosphere valve by the second atmosphere valve seat and second seat separating from each other to allow the atmosphere to be introduced into the variable pressure chamber through the second atmosphere valve and the orifice passage.

2. A valve mechanism of a booster according to claim 1 in which the second seat on the valve element is in the form of an annular projection on a resilient body which projects axially toward the second atmosphere valve seat on the valve plunger.

3. A valve mechanism of a booster according to claim 1 in which the second seat on the valve element is in the form of an annular lip on a resilient body which extends radially inward while the second atmosphere valve seat on the valve plunger is in the form of an axially extending annular projection which becomes seated on a side of the annular lip.

4. A valve mechanism of a booster according to claim 1 in which the valve element comprises a first valve element having its one end secured to the valve body and the first seat formed on the other end, and a second valve element carried by the first valve element and having the second seat formed thereon.

5. A valve mechanism of a booster according to claim 1 in which the first seat and the second seat on the valve element are formed by an integral resilient body.

6. A valve mechanism of a booster according to claim 1 in which the second atmosphere valve seat on the valve plunger is in the form of an annular projection on a resilient body which projects axially toward the second seat on the valve element.

7. A valve mechanism of a booster according to claim 6 in which the second atmosphere valve seat on the valve plunger has a lower rigidity than the first seat on the valve element.

8. A valve mechanism of a booster according to claim 1 in which the second seat on the valve element has a lower rigidity than the first seat.

9. A valve mechanism of a booster according to claim 1, further comprising a third atmosphere valve located at a location nearer the atmosphere than the second atmosphere valve for allowing or interrupting a communication of the second atmosphere valve with the atmosphere, and a second orifice passage for allowing a communication of a portion of the third atmosphere valve disposed toward the second atmosphere valve with the atmosphere, the arrangement being such that when the booster is inoperative, the first atmosphere valve, the second atmosphere valve and the third atmosphere valve are all closed while when the booster is actuated, the first atmosphere valve opens to allow the atmosphere to be introduced into the variable pressure chamber through the orifice passage, followed by the opening of the second atmosphere valve which allows the atmosphere to be introduced into the variable pressure chamber through the orifice passage and the second orifice passage, and further followed by the opening of the third atmosphere valve.

10. A valve mechanism of a booster including a vacuum valve for opening or closing a communication between a constant pressure chamber and a variable pressure chamber defined across a power piston; a first atmosphere valve for opening or closing a communication of the variable pressure chamber with the atmosphere, the first atmosphere valve being slidably disposed inside the power piston and comprising a first atmosphere valve seat formed on a valve plunger which is linked to an input shaft and a first seat formed on a valve element and adapted to be seated upon the first atmosphere valve seat; a second atmosphere valve for opening and closing a communication of the first atmosphere valve with the atmosphere disposed at a location nearer the atmosphere than the first atmosphere valve, the second atmosphere valve comprising a second atmosphere valve seat formed on the valve plunger and a second seat formed on the valve element, the second seat on the valve element being in the form of an annular lip on a resilient body which extends radially inward and the second atmosphere valve seat being in the form of an axially extending annular projection which becomes seated on a side of the annular lip; and an orifice passage for allowing a communication between a portion of the second atmosphere valve which is located toward the first atmosphere valve and the atmosphere, the orifice passage comprising a notch formed partly in the second atmosphere valve seat on the valve plunger, wherein when the booster is inoperative, the first atmosphere valve and the second atmosphere valve are both closed by the first seat on the valve element being seated upon the first atmosphere valve seat on the valve plunger and the second seat on the valve element being seated upon the second atmosphere valve seat on the valve plunger to interrupt the communication of the variable pressure chamber with the atmosphere and when the booster is actuated the atmosphere is introduced into a space defined by the first atmosphere valve, the second atmosphere valve, the valve plunger and the valve element through the orifice passage by the first atmosphere valve by the first atmosphere valve opening by the first atmosphere valve seat and the first seat separating from each other to allow the atmosphere to be introduced into the variable pressure chamber through the orifice passage followed by the opening of the second atmosphere valve by the second atmosphere valve seat and second seat separating from each other to allow the atmosphere to be introduced into the variable pressure chamber through the second atmosphere valve and the orifice passage.

11. A valve mechanism of a booster including a vacuum valve for opening or closing a communication between a constant pressure chamber and a variable pressure chamber defined across a power piston; a first atmosphere valve for opening or closing a communication with the atmosphere, the first atmosphere valve being slidably disposed inside the power piston and comprising a first atmosphere valve seat formed on a valve plunger which is linked to an input shaft and a first seat formed on a valve element and adapted to be seated upon the first atmosphere valve seat; a second atmosphere valve for opening and closing a communication of the first atmosphere valve with the atmosphere disposed at a location nearer the atmosphere than the first atmosphere valve, the second atmosphere valve comprising a second atmosphere valve seat formed on the valve plunger and a second seat formed of a low density material which permits a permeation of the atmosphere therethrough for allowing a communication between a portion of the second atmosphere valve which is located toward the first atmosphere valve and the atmosphere and being formed on the valve element, wherein when the booster is inoperative, the first atmosphere valve and the second atmosphere valve are both closed by the first seat on the valve element being seated upon the first atmosphere valve seat on the valve plunger and the second seat on the valve element being seated upon the second atmosphere valve seat on the valve plunger to interrupt the communication of the variable pressure chamber with the atmosphere and when the booster is actuated the atmosphere is introduced into a space defined by the first atmosphere valve, the second atmosphere valve, the valve plunger and the valve element through the second seat by the first atmosphere valve opening by the first atmosphere valve seat and the first seat separating from each other to allow the atmosphere to be introduced into the variable pressure chamber through the second seat followed by the opening of the second atmosphere valve by the second atmosphere valve seat and second seat separating from each other to allow the atmosphere to be introduced into the variable pressure chamber through the second atmosphere valve and the second seat.

* * * * *